(12) United States Patent
Gjovik et al.

(10) Patent No.: US 12,186,983 B2
(45) Date of Patent: *Jan. 7, 2025

(54) APPARATUS, SYSTEM AND METHOD OF PROVIDING A FFF PRINTING NOZZLE

(71) Applicant: JABIL INC., St. Petersburg, FL (US)

(72) Inventors: Erik Gjovik, St. Petersburg, FL (US); William J. MacNeish, III, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,915

(22) Filed: Aug. 4, 2021

(65) Prior Publication Data
US 2022/0024128 A1    Jan. 27, 2022

Related U.S. Application Data

(63) Continuation of application No. 16/322,650, filed as application No. PCT/US2017/045086 on Aug. 2, 2017.
(Continued)

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B29C 64/295* (2017.08);
(Continued)

(58) Field of Classification Search
None
See application file for complete search history.

(56) References Cited

U.S. PATENT DOCUMENTS

| 8,827,684 B1 | 9/2014 | Schumacher et al. |
| 2004/0217186 A1 | 11/2004 | Sachs |

(Continued)

FOREIGN PATENT DOCUMENTS

| CN | 101568433 | 11/2011 |
| CN | 203957361 U | 11/2014 |

(Continued)

OTHER PUBLICATIONS

International Search Report, dated Sep. 19, 2017 for PCT/US2017/045086.

(Continued)

*Primary Examiner* — Yung-Sheng M Tsui
(74) *Attorney, Agent, or Firm* — Riverside Law LLP

(57) ABSTRACT

An apparatus, system and method for providing a nozzle having refined print control and enhanced printing speed by providing, on the inside or outside or on an interstitial substrate layer, of any metallic or non-metallic nozzle of a non-conductive surface suitable to support sensors relevant to the FFF process. Heat, force, flow, strain, stress, extrusion force, and like sensors may be provided on the inside or the outside of any nozzle, or on an interstitial substrate layer on the inside or outside of any nozzle. The sensors may be provided about the center access through the nozzle, longitudinally along the center access of the nozzle, or at any of various points along the nozzle, wherein the placement or shape of such sensors may vary in accordance with the type of sensing to be performed by the subject sensor.

1 Claim, 19 Drawing Sheets

Related U.S. Application Data

(60) Provisional application No. 62/371,614, filed on Aug. 5, 2016.

(51) Int. Cl.

| | | |
|---|---|---|
| *B29C 64/295* | (2017.01) | |
| *B29C 64/386* | (2017.01) | |
| *B33Y 30/00* | (2015.01) | |
| *B33Y 50/00* | (2015.01) | |
| *B33Y 50/02* | (2015.01) | |

(52) U.S. Cl.
CPC ............ *B29C 64/386* (2017.08); *B33Y 30/00* (2014.12); *B33Y 50/00* (2014.12); *B33Y 50/02* (2014.12)

(56) References Cited

U.S. PATENT DOCUMENTS

| | | | | |
|---|---|---|---|---|
| 2012/0070523 A1* | 3/2012 | Swanson | ................ | B29C 48/02 |
| | | | | 425/96 |
| 2013/0089642 A1* | 4/2013 | Lipson | ................... | B33Y 10/00 |
| | | | | 426/115 |
| 2014/0044822 A1 | 2/2014 | Mulliken | | |
| 2016/0082641 A1 | 3/2016 | Bogucki | | |
| 2016/0257068 A1 | 9/2016 | Albert | | |
| 2016/0303789 A1 | 10/2016 | Bogue | | |
| 2017/0100888 A1 | 4/2017 | Batchelder | | |
| 2017/0151704 A1 | 6/2017 | Go | | |
| 2017/0252827 A1 | 9/2017 | Sachs | | |
| 2017/0361501 A1* | 12/2017 | Van Der Zalm | ....... | B33Y 30/00 |
| 2018/0027615 A1 | 1/2018 | Rios | | |
| 2018/0200955 A1 | 7/2018 | Hoelldorfer | | |
| 2019/0030602 A1* | 1/2019 | Sachs | .................... | B33Y 70/00 |
| 2020/0238621 A1 | 7/2020 | Koc | | |
| 2020/0324469 A1 | 10/2020 | Zhang | | |

FOREIGN PATENT DOCUMENTS

| | | | | |
|---|---|---|---|---|
| CN | 204054675 | | 12/2014 | |
| CN | 204054675 U | | 12/2014 | |
| CN | 104718063 | | 6/2015 | |
| CN | 205130404 | | 4/2016 | |
| CN | 205130404 U | | 4/2016 | |
| WO | 2016019049 | | 2/2016 | |
| WO | 2016038356 | | 3/2016 | |
| WO | WO-2016102669 A1 * | 6/2016 | ......... | B29C 35/0805 |
| WO | WO-2016187106 A1 * | 11/2016 | | |
| WO | WO-2017152142 A1 * | 9/2017 | ............ | B22F 1/0059 |

OTHER PUBLICATIONS

Written Opinion of the International Searching Authority, dated Sep. 18, 2017 for PCT/US2017/045086.

International Preliminary Report on Patentability, dated Feb. 5, 2019 for PCT/US2017/045086.

Office Action (Non-Final Rejection) dated Oct. 3, 2023 for U.S. Appl. No. 16/933,816 (pp. 1-7).

Office Action (Notice of Allowance and Fees Due (PTOL-85)) dated Dec. 6, 2023 for U.S. Appl. No. 17/393,883 (pp. 1-2).

Vac Aero, Vacuum Deposition Processes, Aug. 10, 2015 by Dan Herring (Year: 2015).

* cited by examiner

APPARATUS, SYSTEM AND METHOD OF PROVIDING A FFF PRINTING NOZZLE

CROSS-REFERENCE TO RELATED APPLICATIONS

The present application is a Continuation Application of U.S. application Ser. No. 16/322,650, filed Feb. 1, 2019, entitled: "Apparatus, System and Method of Providing a FFF Printing Nozzle," which claims the benefit of and priority to International Application No. PCT/US2017/045086, filed Aug. 2, 2017, entitled: Apparatus, System and Method of Providing a FFF Printing Nozzle, which claims priority of and priority to U.S. Provisional Application No. 62/371,614, filed Aug. 5, 2016, entitled "Apparatus, System and Method of Providing a FDM Printing Nozzle," which are herein incorporated by reference in their entirety.

BACKGROUND

Field of the Disclosure

The present disclosure relates to three-dimensional printing, and, more specifically, to an apparatus, system and method of providing a nozzle suitable for fused deposition of material (FFF) printing.

Description of the Background

Three dimensional ("3D") printing has constituted a very significant advance in the development of not only printing technologies, but also of product development capabilities, prototyping capabilities, experimental capabilities, and so on. Of available 3D printing technologies, fused deposition of material, or "FFF", printing is one of the most significant types of 3D printing that has been developed. FFF is an additive manufacturing technology that allows for the creation of 3D elements on a layer-by-layer basis, starting with the base, or bottom, layer of a printed element and printing to the top, or last, layer via the use of, for example, heating and extruding thermoplastic filaments into the successive layers. That is, the FFF printer nozzle heats the thermoplastic to a semi-liquid state, and deposits the semi-liquid thermoplastic in variably sized beads along the extrusion path plan provided for the building of the element. The bead size may vary based on the part, or aspect of the part, then-being printed. Moreover, if structural support for an aspect of a part is needed, the FFF printer may deposit removable material to act as a sort of scaffolding to support the aspect of the part. Accordingly, FFF may be used to build simple or complex geometries for experimental or functional parts, such as for use in prototyping, low volume production, manufacturing aids, and the like.

However, the use of FFF in broader applications, such as medium to high volume production, is severely limited due to a number of factors affecting FFF, and in particular affecting the printing speed for the FFF process. As referenced, in FFF printing it is typical that a heated thermoplastic is squeezed outwardly from a heating nozzle onto either a plate or a previous layer of the part being produced. This nozzle is moved about robotically in accordance with a pre-entered geometry, such as may be entered into a processor to control the robotic movements of the nozzle to form the part desired. Because of the advances in robotics and processing speed, the "choke point" for the FFF printing process is generally the nozzle itself. In particular, control over the speed of heating and cooling of the nozzle, and in particular refinements in the control and start/stop timing of printing provided by advanced control of heating and cooling of the nozzle, will allow for significant improvements in the printing provided by FFF technologies. Accordingly, the ability to provide refined sensing of various aspects associated with FFF printing, such as heating and cooling, pressure on the print material, and the like, would allow for enhanced feedback that would enable refinement of the FFF process.

Notwithstanding the foregoing, currently available nozzles, for the most part, are metallic, and thus conductive, in nature. Thereby, not only is refined control of heating and cooling less available due to the permeation of heat to undesired aspects of the metallic nozzle because of the typically conductive nature of the nozzle, but further refined sensing is difficult if not impossible due to the requirement that any sensors associated with the nozzle be "bolt-on" sensors (so as not to be interfered with because of the conductive nature of the nozzle with which they are associated). That is, the bolt-on nature of the sensors is required because operation of any sensors associated with the nozzle must remain conductively distinct from the typically conductive metallic nozzle.

Accordingly, the known art suffers from two significant issues which impede the ability to improve the FFF printing process. The first of these impediments is the inability to provide refined control of heating and cooling on the printing nozzle or on particular aspects thereof. The second impediment is the prolific use of bolt-on sensors as the sole methodology of sensing the performance of available metallic nozzles, which limits the number of sensors and information sensed, and thereby the feedback, that can be provided via currently used sensors.

Therefore, the need exists for an apparatus, system, and method for providing an FFF printing nozzle having refined print control and enhanced printing speed, such as based on improved feedback provided by nozzle-based sensors.

SUMMARY

The disclosed apparatuses, systems and methods provide a nozzle suitable for FFF printing having refined print control and enhanced printing speed by providing, on the inside or outside or on an interstitial substrate layer, of any metallic or non-metallic nozzle of a non-conductive surface suitable to support sensors relevant to the printing process. For example, heat, force, flow, strain, stress, extrusion force, and any other aspect that may be sensed may thus be sensed by a nozzle integrated sensor provided on the inside or the outside of any nozzle, or on an interstitial substrate layer on the inside or outside of any nozzle. Such sensors may be provided about the center access through the nozzle, longitudinally along the center access of the nozzle, or at any of various points along the nozzle, wherein the placement or shape of such sensors may vary in accordance with the type of sensing to be performed by the subject sensor.

Thus, the disclosed embodiments provide an apparatus, system, and method for providing nozzle having refined print control and enhanced printing speed, such as based on improved feedback provided by nozzle-based sensors.

BRIEF DESCRIPTION OF THE DRAWINGS

The detailed description of the embodiments is provided herein in association with the attached drawings, in which like numerals may represent like items, and in which.

DETAILED DESCRIPTION

Figure 1:
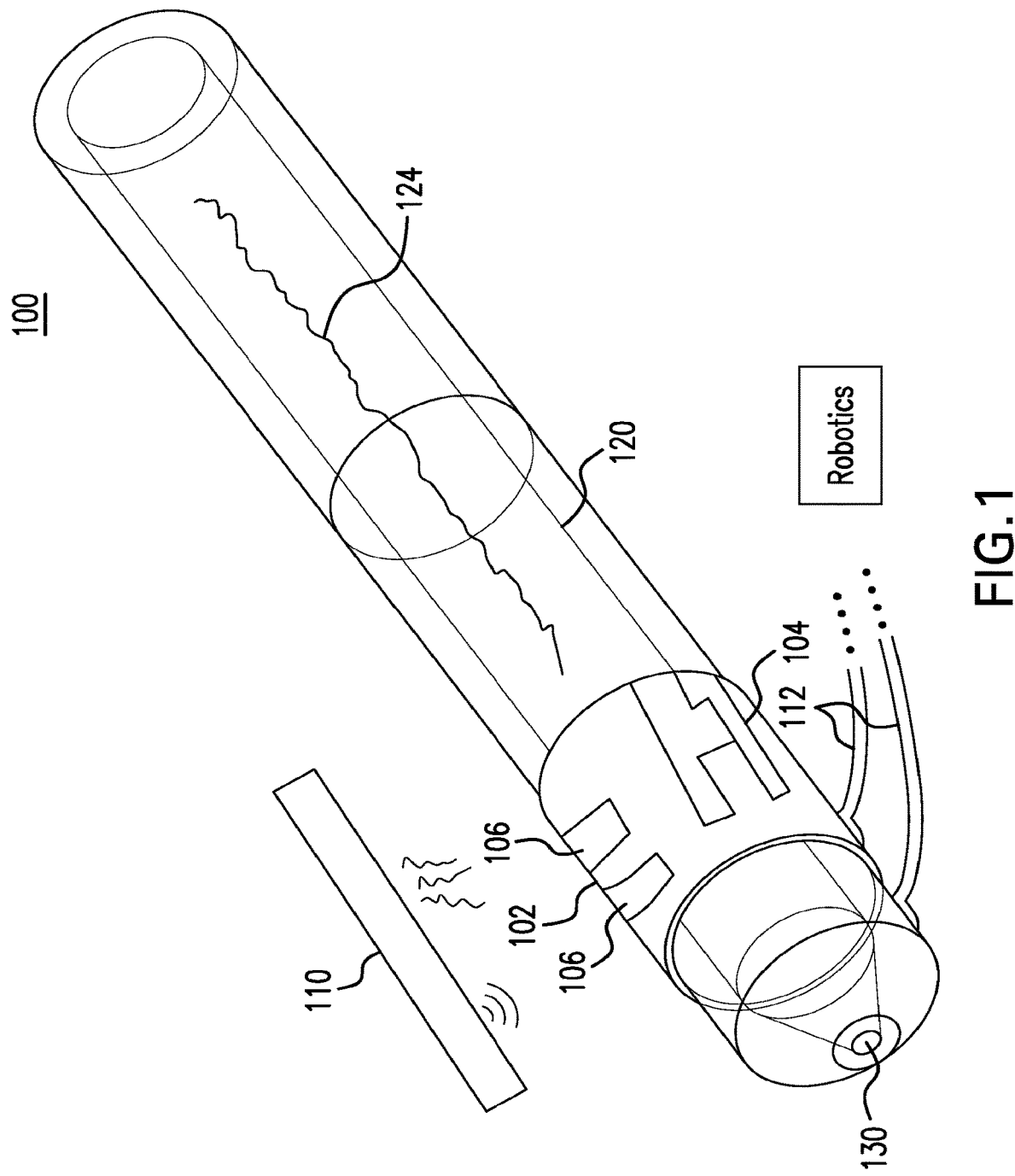
FIG. 1 illustrates an exemplary print nozzle.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The disclosed embodiments of a nozzle suitable for 3D printing may include an integrated-sensor. The nozzle may be metallic, such as with a dielectric coating, wherein such a coating may comprise one or more non-conducting "sheaths" for inclusion over, partially over, within, or partially within a nozzle, such as an inductive metallic nozzle; or may be non-metallic, such as glass or ceramic. One or more sensors may thereby be integrated with the nozzle, the coating associated with the nozzle, and/or with the aforementioned sheath fit over the nozzle. Thereby, heretofore unused or underutilized heat sources may be employed to provide improved locality and on/off timing of heat to the non-conductive nozzle layer or layers and/or to a filament or filaments associated therewith, and one or more sensors having conductive aspects may be directly associated with the nozzle. Further, in alternative or additional embodiments, one or more collets may be included in association with the nozzle, preferably outside of the heated area of the nozzle, such as at the distal end of the nozzle from the nozzle's dispensing orifice, to provide electrical inter-connectivity between the integrated sensors and one or more local or remote computer processing systems which utilize the data generated from the integrated sensors. By way of non-limiting example, signal traces on the nozzle, such as may be manufactured to the nozzle non-conductive area using, for example, PVD or HTCC, or as may be otherwise associated with the nozzle, such as using conductive ink, may connectively associate with spring contacts on a collet acting as a send/receive unit for the nozzle assembly.

The above and the other aspects of the embodiments provide real time characterization of material during the printing process; improved localization, control and targeting of nozzle heating; feedback that may be used in a variety of different manners, such as to create improved print control to allow for higher print speed and greater print accuracy; real time process monitoring and error correction;

an improved process window to allow for the printing of previously unprintable materials; the ability to monitor distinct process parameters from those presently monitored, which may allow for customization of a printing nozzle for distinct printing operation based on particular materials, nozzle orifice sizes, desired print speed, or printing application; the ability to characterize the printing material (i.e., dynamic viscosity, etc.) during the print process—for adjustment of print parameters, and for quality control of the print material supplier; ultra-fast heating and cooling of the printing material; heating modes that may be targeted to specific areas of a print job or to specific materials to be printed, such as a heating mode that measures and separately controls surface verses internal product temperatures; ultra-high temperature materials processing; the application of coatings to allow for the control of friction, temperature, stiction, improved release, wear, and life monitoring; and the capability to measure print material temperature rather than solely exterior nozzle temperature. These and other distinct advantages may be provided in accordance with the foregoing improvements over the known art, such advantages including lower nozzle costs and print costs; provision of the print nozzle as a consumable/disposable good; improved inspectability for contamination; suitability for nozzle production using known semi-conductor and foundry technologies; enhanced design freedom for internal and external nozzle features; and extremely fine control of hot and cold zones for both the nozzle and the printed material.

Factors which may be monitored or subjected to improved monitoring using integrated sensing include not only temperature of the nozzle and/or the print material, but also the internal pressure of the material; the axial and the X-Y forces on the print material and at the nozzle orifice as the print material is dispensed; and improved axial position and print material limit control. These improved aspects may be directly provided by, or provided by feedback in accordance with, the integrated sensing, and may be further improved upon through the use of heretofore underutilized heat sources directed to the nozzle or to the print material itself (as facilitated by a non-conductive nozzle wall), such as inductive heating, infrared heating, conductive heating, ultra-sonic heating, and combinations thereof. This improved sensing and improved heating allows for real time characterization of material as it is being printed, and of each aspect of a print job, which allows for feedback to refine, among other aspects, servo control that dictates the materials extrusion process. The disclosed improved printing apparatus, system, and method may be applied to any type of FFF printing, including thermoplastics, polymers, metals, ceramics, food, and wax printing, by way of non-limiting example.

The skilled artisan will appreciate the deficiencies suffered by known nozzles, which are typically formed of metals, such as brass, and which accordingly typically include, at most, only a bolt-on temperature sensor, such as a thermistor. The integrated solutions provided herein need not provide bolt-ons to do the desired sensing, as the non-conductive wall(s), layer or layers associated with the disclosed nozzle of the embodiments allow for integration of conductive sensors directly with the nozzle.

More particularly, advanced temperature sensing that will allow for optimal print material distribution control requires sensing elements that are fast, closely coupled, and highly sensitive, and consequently all of these requirements can be satisfied only through the use of integrated sensors. Integrated sensors that are connected: directly at the nozzle wall; to a coating on the nozzle wall, such as having a thickness between 0.001 mm and 1 mm; or on a sheath provided about the nozzle wall, place the sensing element as close to, and thus allow for the fastest reactivity to, the operating of the nozzle.

Hence, as illustrated in the diagram of FIG. 1, at least one nonconductive area 102 is provided in association with a nozzle 100. The nonconductive area 102 may be the nonconductive nozzle, or a nonconductive substrate or sheath provided in association with the nozzle 100. That is, the nozzle 100 may be, be substantially, or be on at least its inner- or outer-surface, a dielectric nozzle, such as a glass or ceramic nozzle; or may be a metallic nozzle having associated therewith one or more nonconductive substrates, such as a dielectric substrate, such as a glass or ceramic substrate. That is, nonconductive area 102 may be an integrated sheath, or may be an applied coating. Nonconductive area 102 may allow for implementation of sensing elements 104 directly on the nozzle 100 and/or in proximate association with the print material 124, such as through formation using known semiconductor processes. Such processes may include, for example, sensing elements 104 formed by masking and deposition processes, such as chemical vapor or vacuum deposition processes; sensing elements provided by lamination; sensing elements provided as micro-electromechanical elements; sensing elements provided by semiconductor planar processes; and sensing elements provided that employ microelectronic interconnects, such as wire bonds, stakes, masking/PVD, or micro solder, by way of non-limiting example. Numerous integrated sensors 104 may be provided thereby, such as thermocouples, resistance thermal devices (RTDs), NTC, centered metal oxide, and other sensor types that will be apparent to those skilled in the art in light of the discussion herein.

Additionally, heating elements 106 may be provided, such as a conductive trace or traces, in physical association with the nonconductive substrate 102. Such heating elements may include, by way of non-limiting example, resistive heating elements, an induction heating element (such as around the nozzle proximate to the orifice of the nozzle), an IR/radiative element, a RF coupled element, and so on.

Thus, although the disclosed embodiments of the nozzle 100 may heat and push material for 3D, such as FFF, printing as is known in the art, they also provide refined heating and refined pushing of that material, such as through improved localization of heating and through integrated sensor technologies. These integrated sensors allow for feedback in-process of the ongoing printing. This allows for the process underway to be faster and more controlled, and may additionally allow for feedback to be recorded and analyzed in order to improve subsequent processes.

Heating of the print material 124 in an FFF process is the single most important factor in refining FFF printing. And while fast printing is desirable to move FFF processing forward, faster printing speeds require increased heating, and increased heating leads to less refined control over the heating in known metal nozzles, as well as enhanced difficulty of expedient cooling to stop printing, particularly in highly heat-conductive metal nozzles. In short, high speed, high quality FFF printing requires the transfer of as much controllable energy to the print material 124 as is possible at the greatest mass flow rate to allow for the desired print speed. Accordingly, refined heating methodologies will improve print speed and control in FFF printers. Inductive heating is now overtaking resistance heating as the simplest method for low-to-medium performance FFF printers. Inductive heating 106 may be readily provided in the embodiments, such as coil wrapped about the nozzle using the semiconductor fabrication processes discussed above on a dielectric nozzle/substrate applied to nozzle. However, although inductive heating allows for more expedient heat transfer to the print material 124, it still does not provide for significantly expedited cooling as would be needed to provide for enhanced control in higher speed printing processes.

Accordingly, additional heating elements 110 may be provided to deliver energy, such as for heating, to the print material 124 or to the nozzle 100. Such additional heating elements 110 may be or include radio frequency/microwave heating, which is a fast heating methodology that provides acceptable coupling only for certain print materials 124, good heat penetration only in certain materials, but which is noisy and difficult to control; ultrasonic heating, which is fast heating, which provides excellent coupling and penetration, which provides a direct method of sheer energy injection and boundary migration, but which is very difficult to implement with pre-existing nozzle technologies; infrared radiation, which provides fast heating, adequate coupling, but relatively poor penetration; and plasma heating, which may be expensive to provide but which also provides improved heat delivery, coupling, and penetration over known heating methods. As will be appreciated by the skilled artisan, all of the foregoing improved methodologies are well received in a localized manner by a nonmetallic, such as glass, nozzle.

More particularly, a glass nozzle in combination with ultra-sonic heating may provide high speed, high quality, highly controlled and localized heat printing for certain print materials 124. Moreover, an array of different selected heat delivery types from the aforementioned list of heat delivery methods may best perform in delivering fast printing, improved coupling and penetration, and ease of implementation across various print materials 124. Accordingly, a particular method of heating may be provided for slow, steady heating while another, faster and better controlled heating method, such as ultrasonic heating, may be provided for high speed heating and cooling, and/or for load leveling at control frequencies.

Moreover, the heating source 110, such as the ultra-sonic transducer, may be physically associated, being mechanically held by, in a mechanical holder adjacent to, or as a holder for the nozzle 100, the nonconductive nozzle may allow for optimum delivery of energy from the ultra-sonic transducer when it is aside of the nozzle 100. Further, the mechanical support 112 for the nozzle 100 may further allow for the nozzle 100 having nonconductive features 102 to be less "sticky" than a metallic nozzle, such by a light shaking of the nozzle holder (such as by the robotics moving the nozzle) during delivery of the print material 124. Such movement of the nozzle 100 during delivery of the print material 124 may optimize both delivery and layer adhesion.

More particularly, adhesion/fusion of the layers in FFF printing often presents difficulty in the printing process. This fusion difficulty is often most significant between the zeroeth, or base, layer, and the first deposited layer that is deposited atop the zeroeth layer. The may improve fusion when certain energy sources, such as ultrasonic energy, are used, in part because this energy, once imparted to the print material 124, will continue to resonate within the print material 124 even after dispersion from the nozzle orifice 130. As will be understood, this additional resonant energy provides improved fusion by enhancing fusion energy between layers. Moreover, the shaking of the nozzle 100 in one, or multiple, directions will also improve adhesion, at least in that the shaking adds kinetic energy to the dispersion thereby improving adhesion bonding. The skilled artisan will appreciate, in light of the embodiments, that any of the disclosed controllable power sources and energy-additive methodologies disclosed may enable the additive delivery of energy as discussed, either alone or in combination, to improve layer adhesion.

These advantages of using nonconductive materials for the nozzle 100 may be provided not only in conjunction with ultrasonic heating, but also for other types of heat sources, such as infrared. For example, the skilled artisan will appreciate that infrared heat source may not be conveniently employed with a metal nozzle because of uncontrolled heat conduction through the metal, but may readily be employed with a silica or quartz nozzle, by way of non-limiting example. In short, as an aspect of the disclosed embodiments, the composition of the nozzle 100 may be matched to the transmission spectrum of the heating source 110 used to heat the print material 124, and/or to the receptivity of the use of kinetic energy impartation to improve adhesion.

Another significant limitation on enhanced print speed and control for FFF printers is flow resistance at desirable force and pressure levels on the print material 124. Flow resistance may occur due to the viscous shear generated by surface adhesion for certain surfaces, such as metals, typically associated with the inner chamber 120 of the nozzle 100 in the known art. Obviously, as shear loss is decreased, more print material 124 may be pushed through the inner chamber 120 of the nozzle 100 at a higher rate, and thus improved speed and control of the delivery of print material 124 through the nozzle orifice 130 will occur. In fact, in the known art the greatest prompter of the need for print tool replacement in FFF printing is gunked, clogged, or worn interior nozzle chambers.

Thus, the most desirable characteristics for the inner chamber 120 of the nozzle 100 are a hard and durable surface, a highly slippery surface, and a lower thermal conductivity. The latter desirable characteristic, lower thermal conductivity, occurs because improved control of heat delivery is provided via thin walls having low thermal conductivity. This is because, in part, the heating goes only to where it is targeted, rather than being distributed along portions of the length of the tool as would occur with metallic nozzles in the known art. Thus, by way of example, heating may be targeted closer to the tip of the nozzle of the embodiments for a more refined bead delivered at the nozzle orifice 130, while heating may occur farther up the nozzle from the tip if a thicker bead is desired for delivery from the nozzle orifice 130.

Nozzle characteristics that prevent clogging and wear may be provided by glass, ceramic, or ceramic-like hard metal materials to either form the nozzle, or to coat the inner chamber 120 of the nozzle 100. To the extent a coating is employed, the coating may be applied using the semiconductor coating and manufacturing processes discussed herein throughout, such as those used to deliver a coated substrate upon which sensors 104 may be applied.

That is, aspects of the disclosed embodiments may be employed within or without a nonconductive or a metal nozzle. For example, dielectric layer(s), such as glass, may be deposited, such as via vacuum deposition, CVD, PVD, or sputtering, and within or without a metal nozzle, thereby providing an intermediate dielectric substrate on which conductive layers, such as for the formation of sensors, may be placed. Needless to say, dielectric deposition via the foregoing or other known methods may occur in order to build sensors or to decrease adhesion of the print material 124 inside the inner chamber 120 as the print material 124 passes to the nozzle orifice 130.

Yet further, the disclosed multiple heat energy delivery mechanisms help to prevent clogging. More specifically, one of the main dynamics that promotes clogging is that a traditional nozzle must be run at a significant temperature-rise over the melting point of the thermoplastic. When the print material 124 flow is stopped, the plastic and the (over)heated nozzle then come to equilibrium, which causes the print material to heat toward the nozzle temperature, and this degrades the polymer, making it crunchy and thereby causing clogging. The providing, by the embodiments, of 'slow' and 'fast' heating allows for the use of the 'slow' method to maintain below the degradation temperature of the print material, and use of the 'fast' mode only at flow condition. Thus, when flow stops, the 'fast' method may be turned off quickly, preventing a temperature rise above degradation temperature.

Figure 2A:
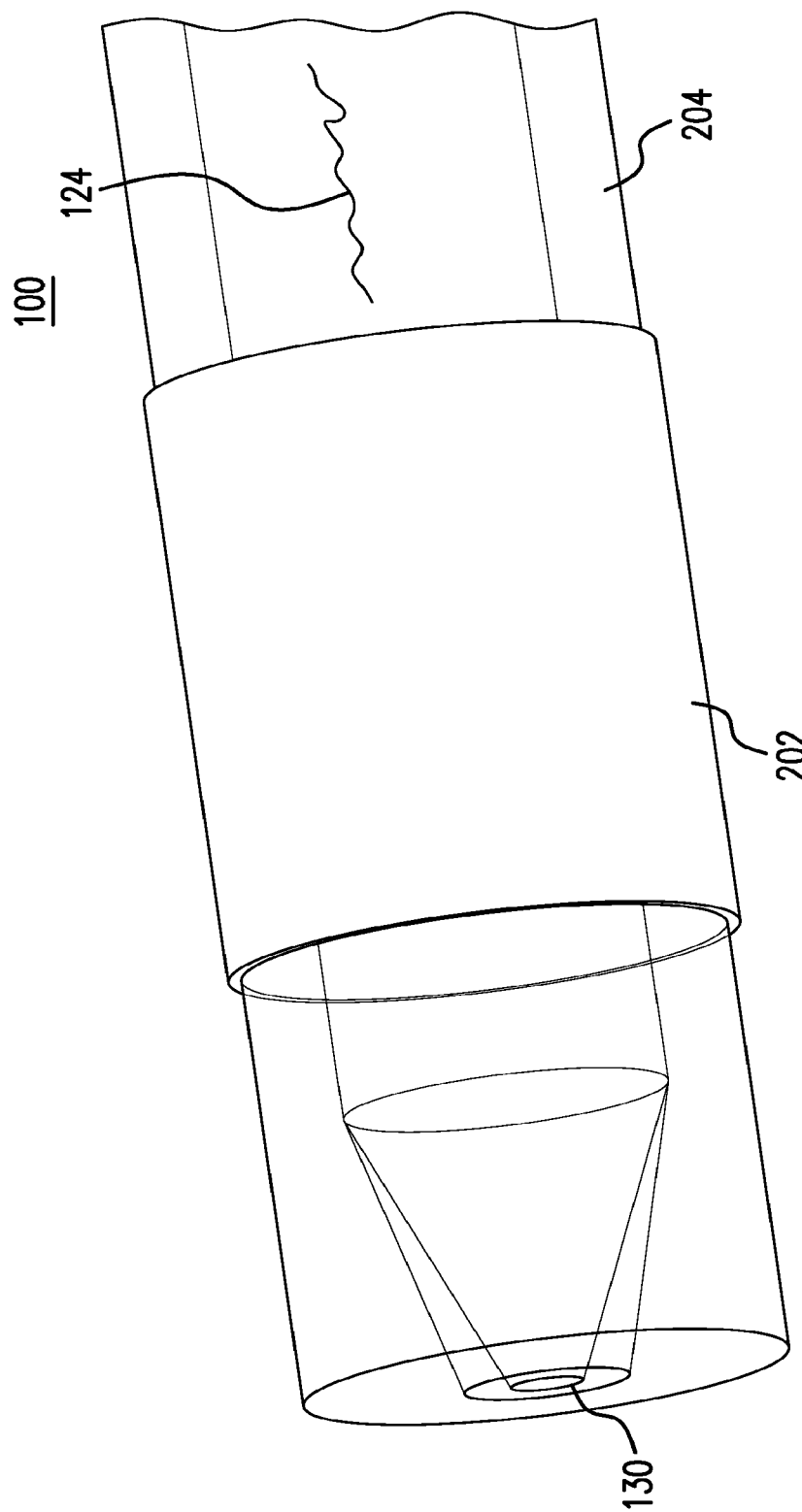
FIG. 2A illustrates exemplary print nozzle.
Figure 2B:
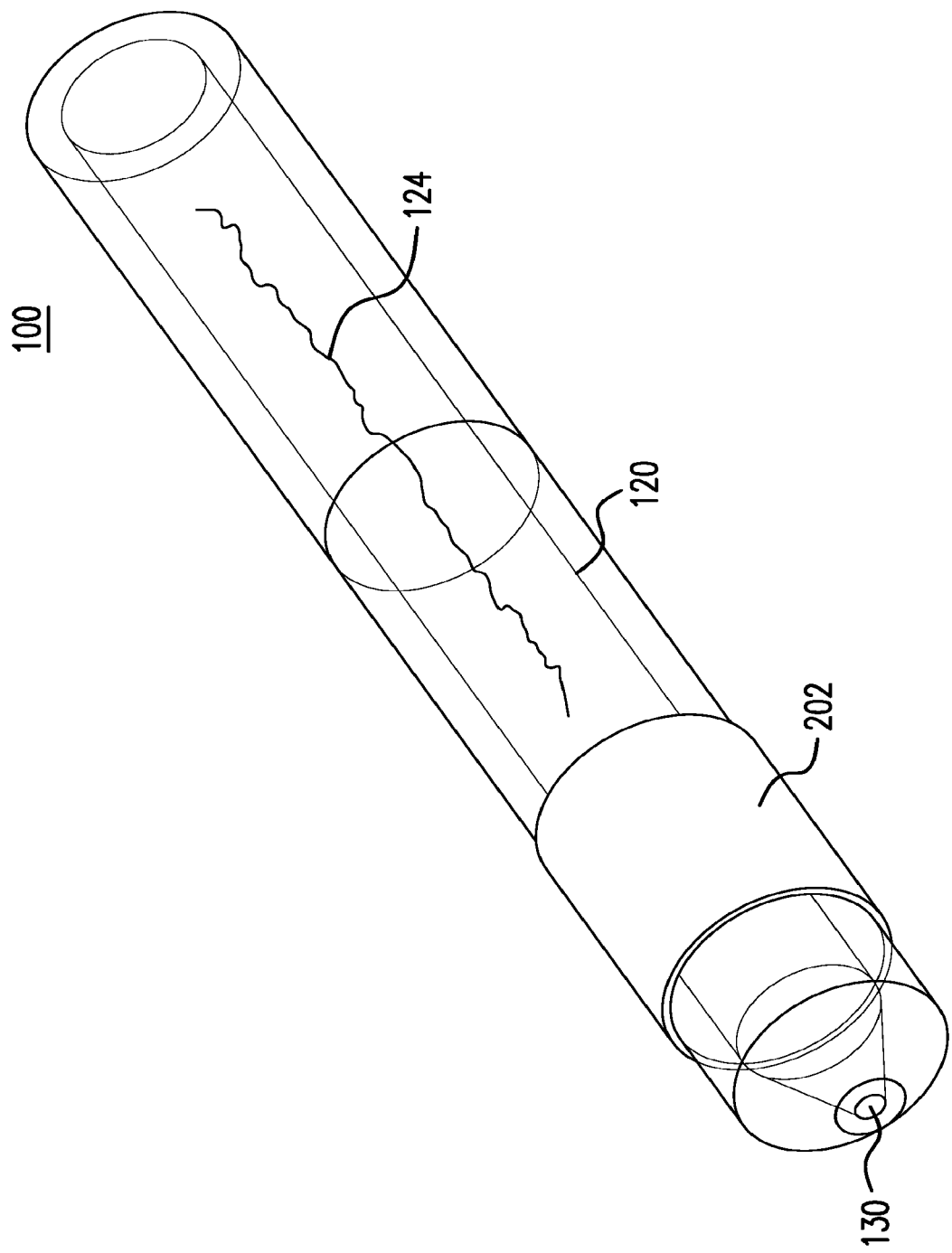
FIG. 2B illustrates exemplary print nozzle.
Figure 2C:
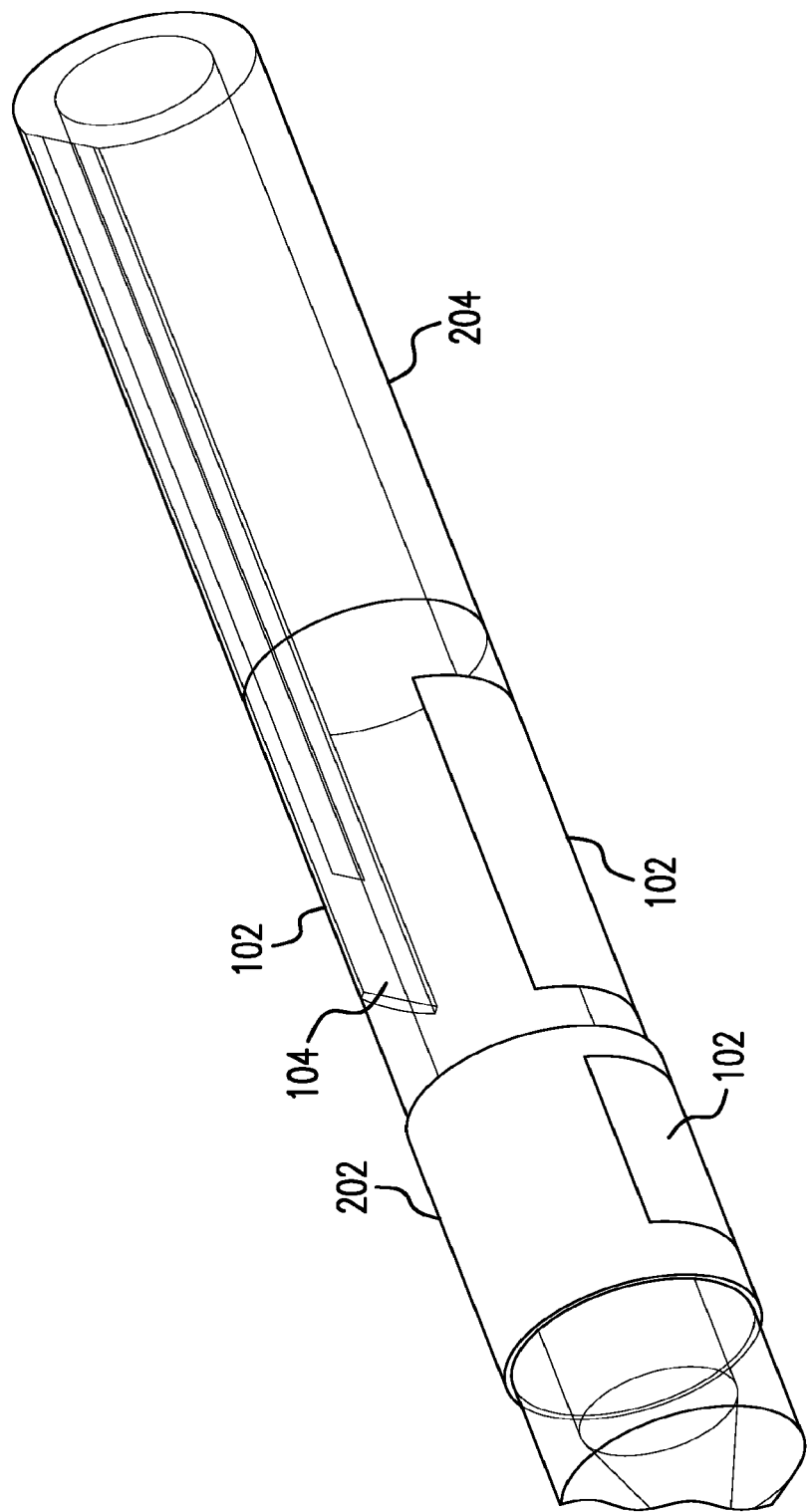
FIG. 2C illustrates exemplary print nozzle.

FIGS. 2A and 2B illustrate an induction sheath 202 on an insulator shank 204 that is formed of glass or ceramic in accordance with the disclosed embodiments. The illustrated inductor sheath 202 may be press fit, plasma vapor deposited or plated, rolled foil, or the like in its application to the insulator shank 204 associated with the nozzle 100. The proximity of the inductor sheath 202 to the nozzle 100 may allow for highly refined control of print materials 124 delivered through the nozzle 100, such as allowing for expedited heating and cooling, such as near-immediate heat up and cool down/shut off, to allow for the pushing of significant print material 124 through the nozzle orifice 130. Of note, although some print materials 124 may require a longer lateral distance heating zone for delivery of those print materials 124, this may be readily addressed by enhancing the longitudinal length of the inductor sheath 202 shown in FIGS. 2A and 2B. Obviously, as the longitudinal length of the inductor sheath 202 increases, the heating zone on approach to the nozzle orifice 130 increases accordingly. Moreover, to the extent the illustrated inner chamber 120 and insulator shank 204 are a dielectric, such as a glass or ceramic material, the face 210 of the nozzle 100 about the nozzle orifice 130 may be large and low angle, which reduces globbing and improves the refinement of print traces for many print materials 124. FIG. 2C illustrates a nozzle similar to that of FIGS. 2A and 2B, but with additional, partial non-conductive areas 102 applied about the outer, insulating shank 204 of the nozzle 100. These non-conductive areas 102 may serve additional functions, such as the providing of sensors as discussed herein, or such as providing substrates onto which interconnects, such as traces, may be applied to move data and/or to deliver data and activation commands between, for example, the heating sheath 202, any sensors 104, and a send and receive unit (not shown) at the distal end of the nozzle from its orifice 130. Of note and as illustrated herein below, the send and receive unit may be comprised of a collet that may include proprietary or standard interconnects for association with the traces, wires, or interconnects associated with the full or partial sheathes/conductive areas located about the nozzle.

Figure 3A:
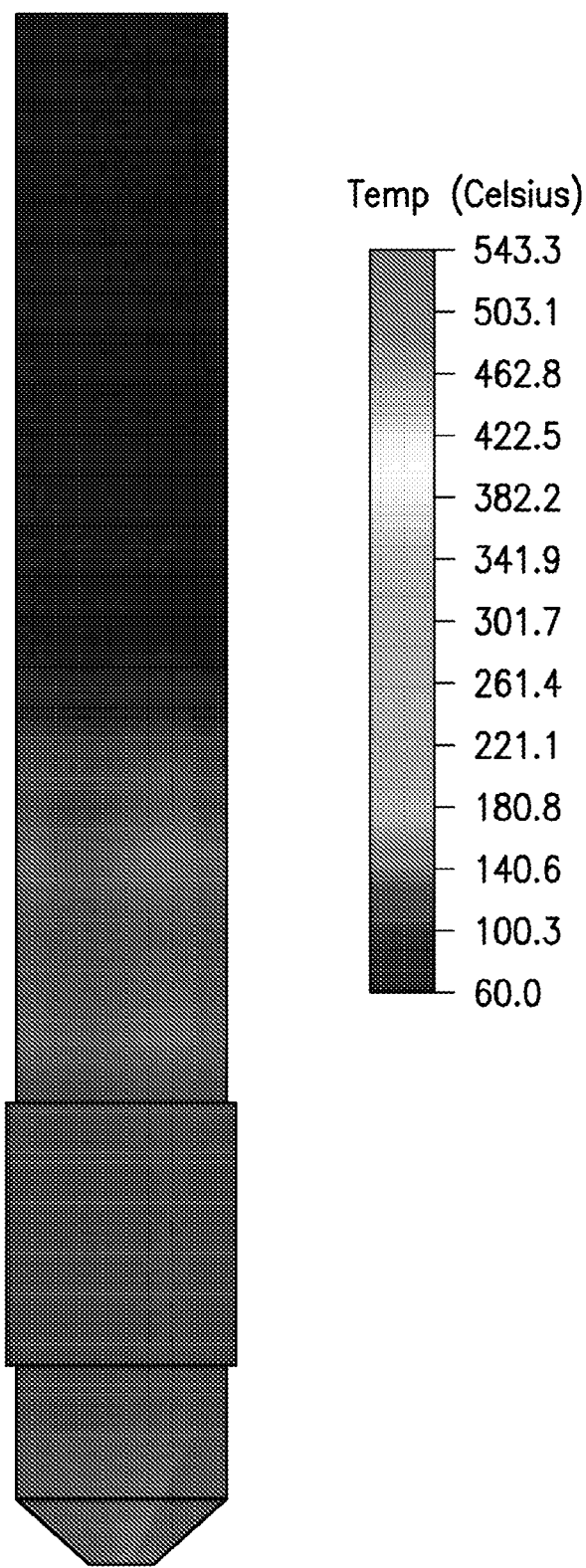
FIG. 3A illustrates a thermal diagram.
Figure 3B:
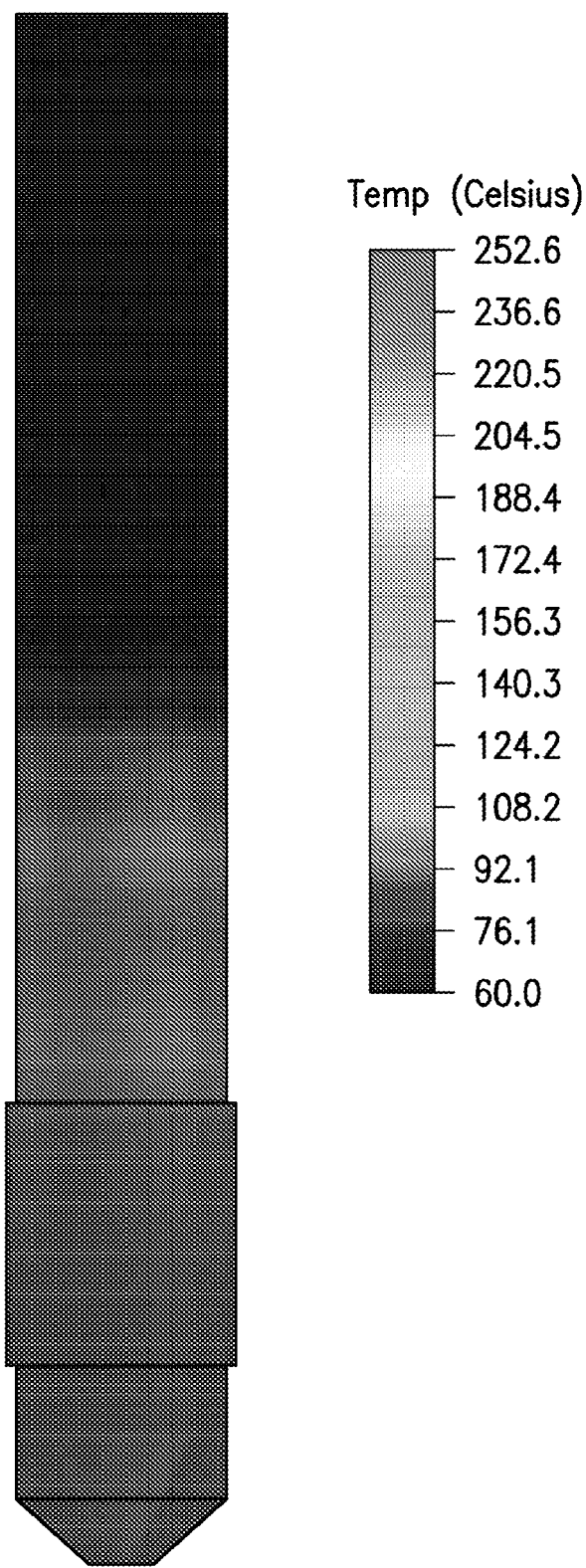
FIG. 3B illustrates a thermal diagram.

FIGS. 3A and 3B are graphical illustrations of a basic inductive set-up for the use of the nozzle of FIG. 2C. As illustrated, higher temperatures are delivered at the heating zone for a given power density input in the illustrated embodiment. Moreover, an enhanced cold hot cold gradient is provided, due to the low thermal conductivity of glass when glass is used in the embodiments of FIG. 2A-2C. Yet further, better control of the hot zone is delivered through the use of the disclosed embodiments, including the length of the nozzle subjected to overall power delivery, and the vertical location along the longitude of the nozzle for the cold hot cold gradient. In short, when inductive heating is used with the disclosed embodiments, performance is similar to but improved over lossy, permeable metals often used with induction heating of FFF nozzles.

Figure 4A:
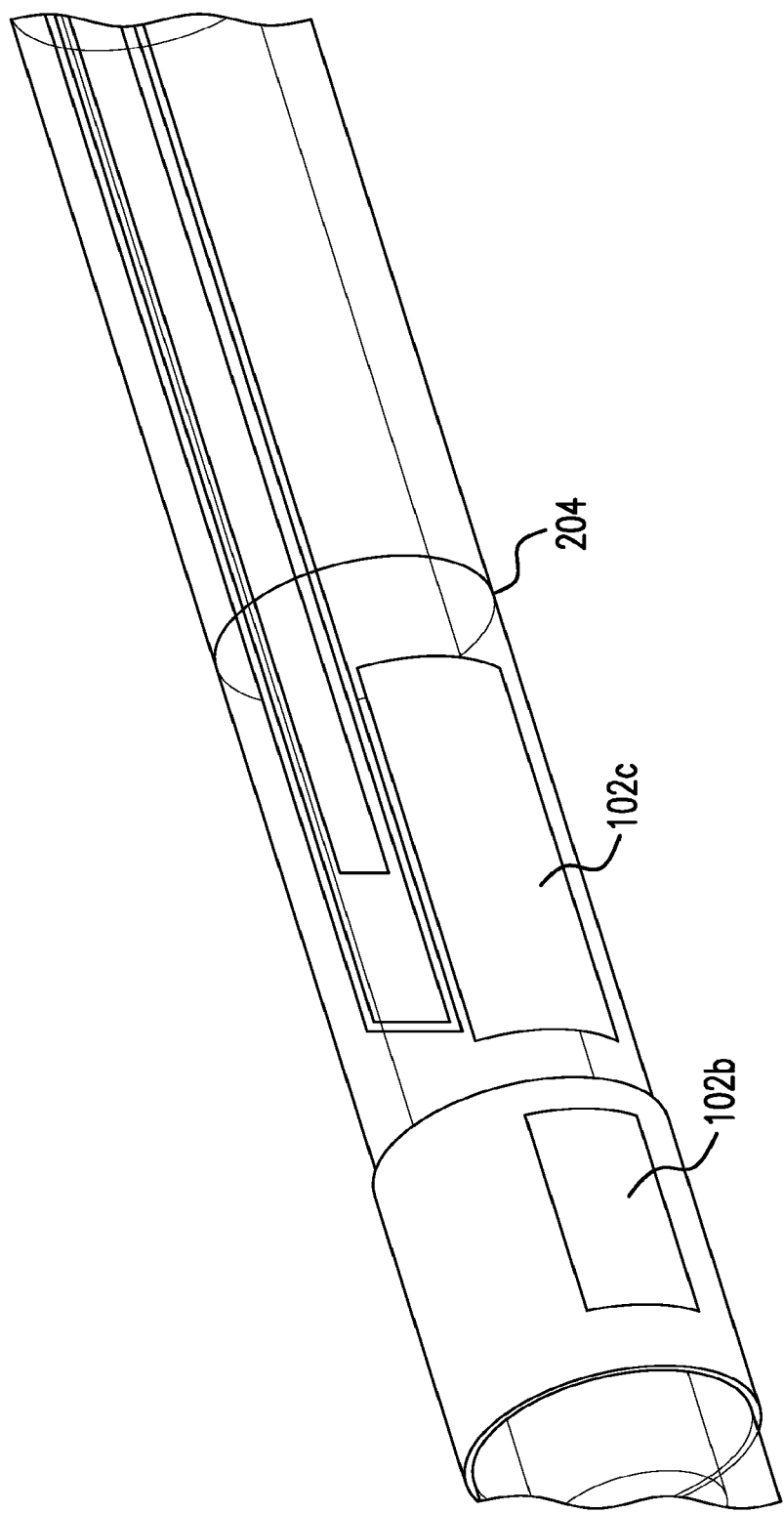
FIG. 4A illustrates exemplary print nozzle.
Figure 4B:
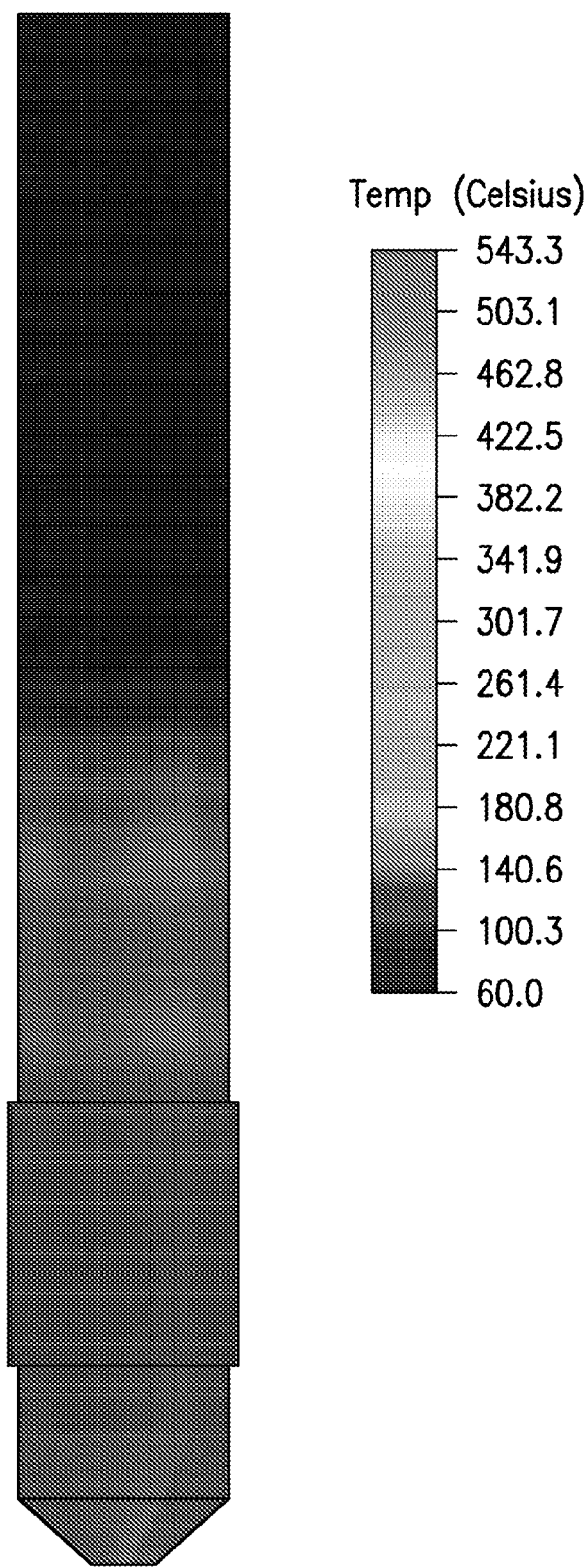
FIG. 4B illustrates a thermal diagram.
Figure 4C:
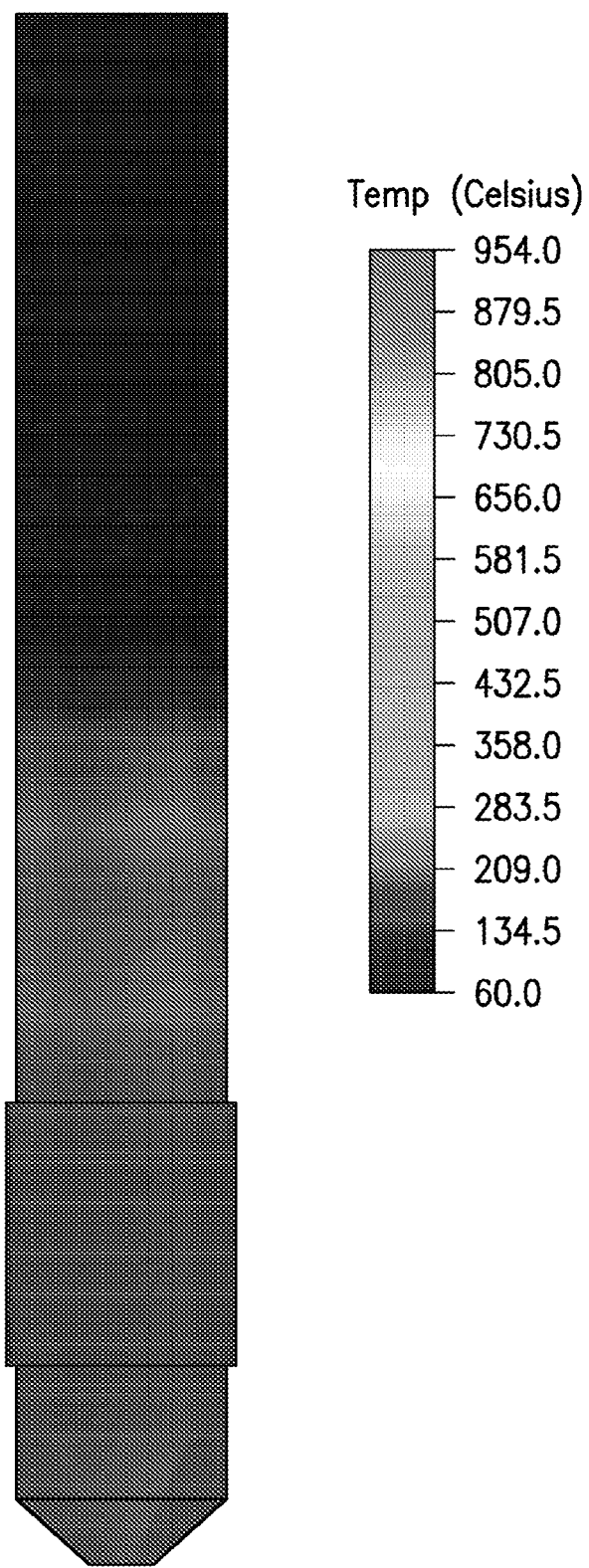
FIG. 4C illustrates a thermal diagram.

FIG. 4 illustrates an embodiment having partial sheathes/nonconductive areas 102b, 102c akin to those illustrated in FIG. 2C, wherein two such partial areas 102b, 102c in view are metalized exterior patch SFC's. These external SFC patches may provide for low emissivity, i.e., radiative loss of heat. Thus, these non-conductive 102b, 102c may perform similarly to a space blanket. These non-conductive 102b, 102c may be applied to shank 204, for example, as masked plasma vapor deposited on glass patches. FIGS. 4B and 4C illustrate the performance of the design of FIG. 4A. Of note, FIG. 4B illustrates performance at an external radiation of E=0.9, and FIG. 4C illustrates performance with no external radiation. It will be noted the slightly higher temperatures for the same power delivery appear in FIG. 4C as compared to FIG. 4B.

Figure 5:
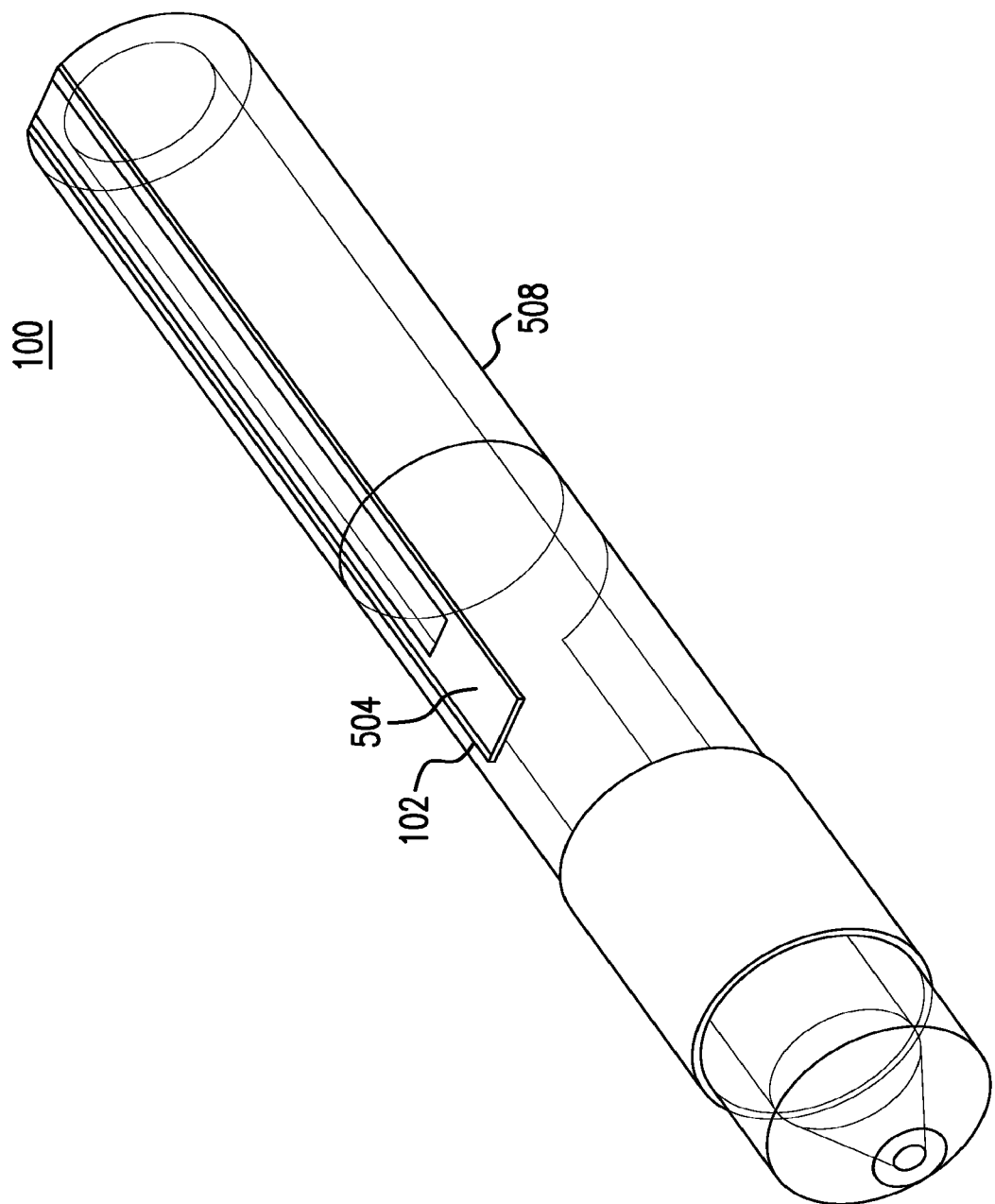
FIG. 5 illustrates exemplary print nozzle.

FIG. 5 illustrates a nozzle 100 having a sheath 502 with a nonconductive area 102, and having a dedicated integrated temperature sensor 504. In the illustration of FIG. 5, the long, longitudinal partial sheath 504 is, by way of example, an integrated RTD element that allows for temperature sensing. This RTD element may be formed using masked PVD on a glass substrate, such as shank 508, in part because a glass substrate provides an insulator. As will be understood by the skilled artisan, the resistance of this RTD element changes as the temperature of the nozzle 100 changes.

Further, and as discussed throughout, in the known art the temperature sensor 504 would typically comprise a semiconductor chip set with wires that would be provided as a bolt-on to the nozzle. On the contrary and in the embodiments of FIG. 5, traces or other inter-connective elements 510 may be provided along the shank 508 of the nozzle 100, and may provide connectivity to a send/receive unit, such as the aforementioned collet, proximate to or on the tool mount. Further and of note, the illustrated RTD element of FIG. 5 may also perform as a near induction sleeve.

Figure 6A:
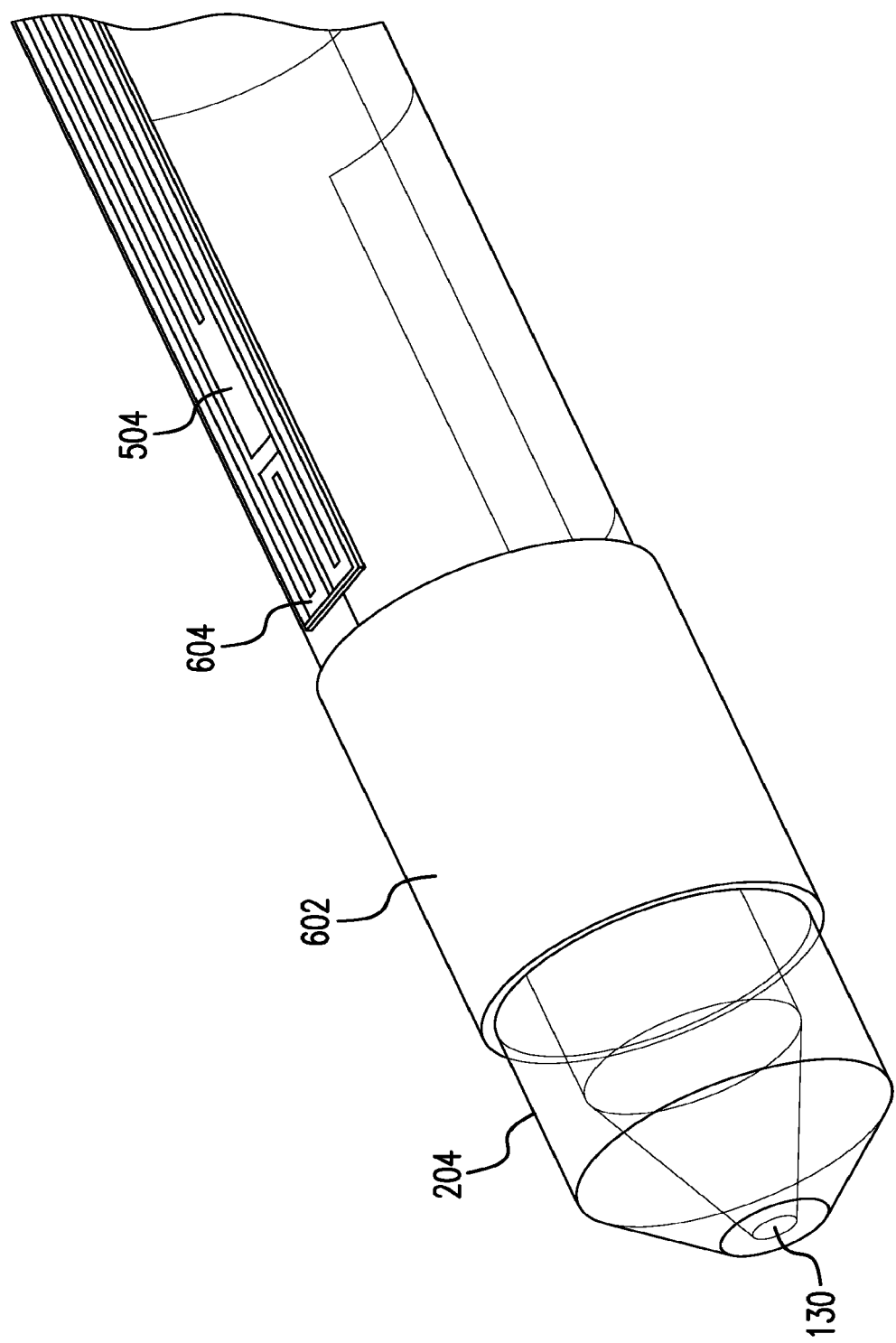
FIG. 6A illustrates exemplary print nozzle.

FIG. 6A illustrates an embodiment including a sheath 602, which may be an inductive nozzle setup, and additional including both temperature 504 and strain 604 sensors. More particularly in this illustration, a micro-strain gauge 604 may be included as part of the RTD sensor 504 illustrated in FIG. 5. In such an embodiment, the DC component, i.e., the low frequency component, of a signal associated with the RTD sensor 504 correlates with performance as a temperature sensor, and the AC component, i.e., the high frequency component, of the signal associated with the RTD sensor 504 correlates with the strain sensed by the strain sensor 604. Accordingly, the sensor may be built as a masked PVD metal on an insulator. The strain gauge 604 provides force feedback of forces on the tool, particularly in the lateral direction.

As such, force and pressure sensors, in addition to temperature sensors as discussed throughout, may be micro-manufactured as a sort of strain gauge onto a surface or a coated substrate of the nozzle. This strain gauge may operate by sensing deformation on the inside or the outside of the nozzle and may thereby or may additionally sense the pressure of disbursement of the printed material. Such pressures may be readily sensed on the outside of a non-metallic nozzle, as pressures inside the nozzle can reach 30 PSI or more.

Figure 6B:
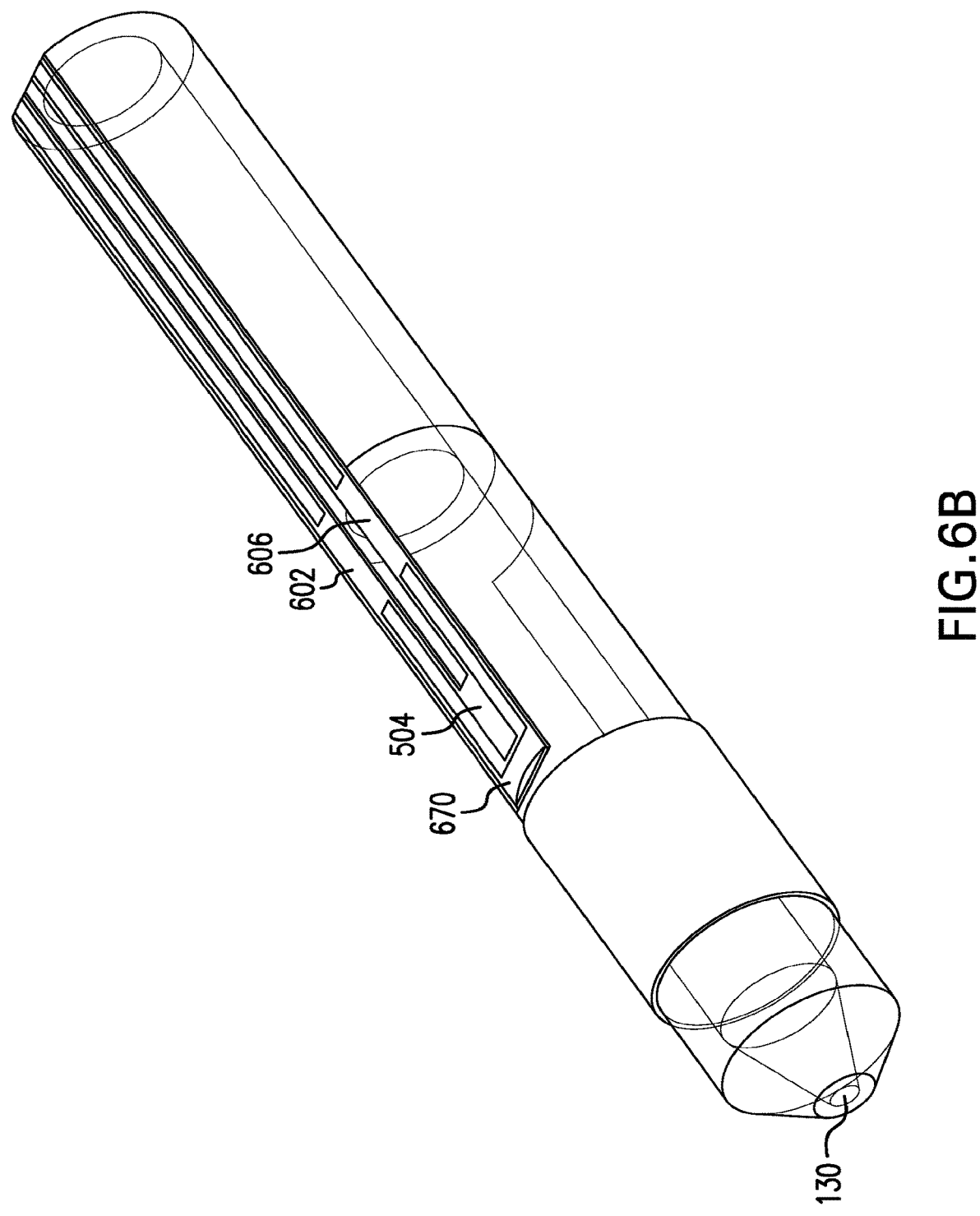
FIG. 6B illustrates exemplary print nozzle.

FIG. 6B, in a manner similar to FIG. 6A, shows a temperature sensor 504 that also acts as a strain sensor 604, but the embodiment of FIG. 6B performs as a multiple strain sensor. In short, RTD sensor 504 provides temperature sensing, while sensors 604 and 606 comprise strain elements that provide strain along the longitudinal access, and, via the differential pair, strain along the access about the shank of the nozzle.

Moreover, trace 670 may optionally be provided in the embodiment of FIG. 6B as a hoop strain element to provide sensing of nozzle pressure. As the skilled artisan will appreciate in light of the discussion herein, the sensing of temperature and pressure, and a knowledge of print material 124 and nozzle properties, allow for the calculation of flow. Further, in disclosed multi-sensor embodiments such as that of FIG. 6B, the signal to noise ratio, such as that generated by the strain sensors, may be optimized through the use of soft glass for the nozzle and/or nozzle shank, the use of longer trace runs to form the sensors, and the placement of strain sensing traces on the nozzle where strain is likely to be the greatest in association with the foregoing factors.

Other aspects may also be provided with the embodiments in order to eliminate or decrease process noise and thereby allow for enhanced process control. For example, infrared energy is emitted at and around the tip of a nozzle (around orifice 130) when the heated print material 124 is released from the nozzle 100. Accordingly, the disclosed non-metallic nozzles 100, and/or the sheath coatings discussed herein, may be colorized such as using dark or black paint, to minimize extraneous infrared emissions and to thereby alleviate infrared process noise as well as improving signal-to-noise ratios for the sensors discussed herein throughout.

Figure 7:
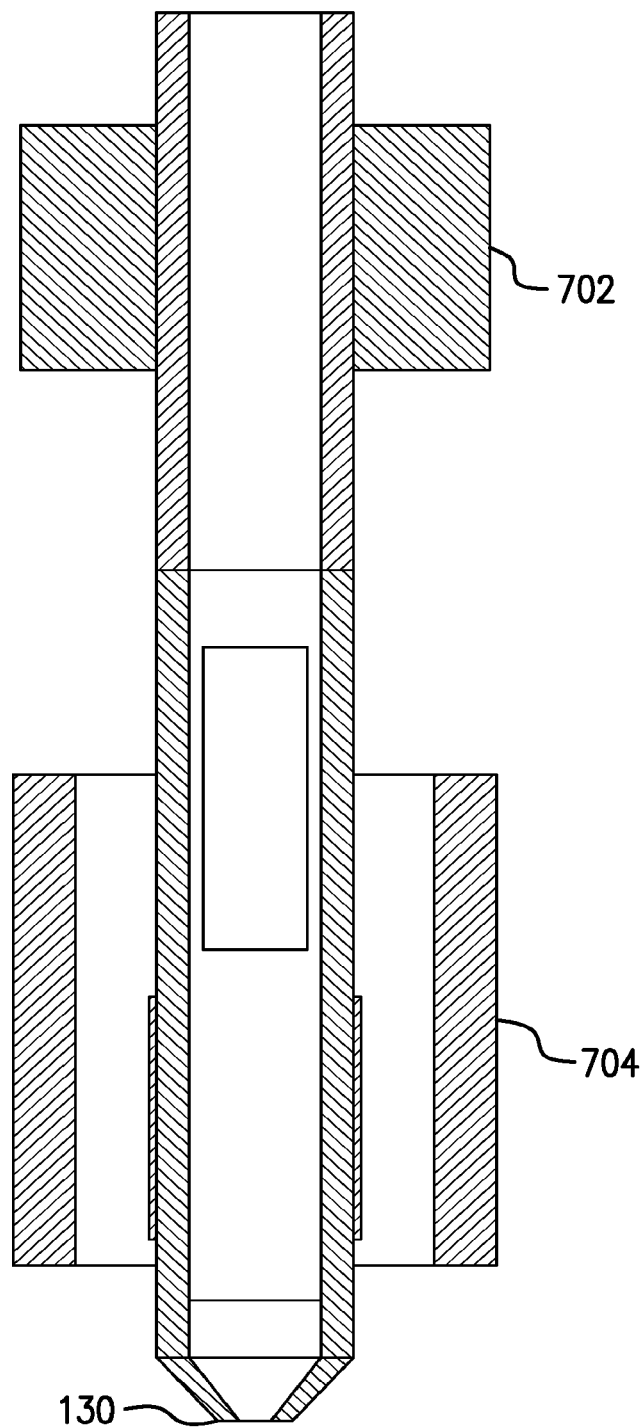
FIG. 7 illustrates exemplary print nozzle.

FIG. 7 illustrates an embodiment wherein multi-modal energy is delivered and/or coupled together to provide heating to one or different types of print materials 124. That is, the ultrasonic transducer 702 provided at the distal end of the nozzle 100 from nozzle orifice 130 of FIG. 7 may heat a first print material 124, and as that print material 124 passes down the nozzle 100 it may be further heated by the inductive, infrared, and/or radio frequency emitter(s) 704 at the end of the nozzle 100 proximate to the nozzle orifice 130; or, for certain print materials 124, the ultrasonic transducer 702 may deliver energy to heat the print material 124, and the inductive, infrared, and/or radio frequency emitter(s) 704 may be inactive for that material, but for a second, different print material 124, the converse may occur, i.e., the ultrasonic transducer 702 may be inactive while one or more of the inductive, infrared, and/or radio frequency emitter(s) 704 is active.

Figure 8:
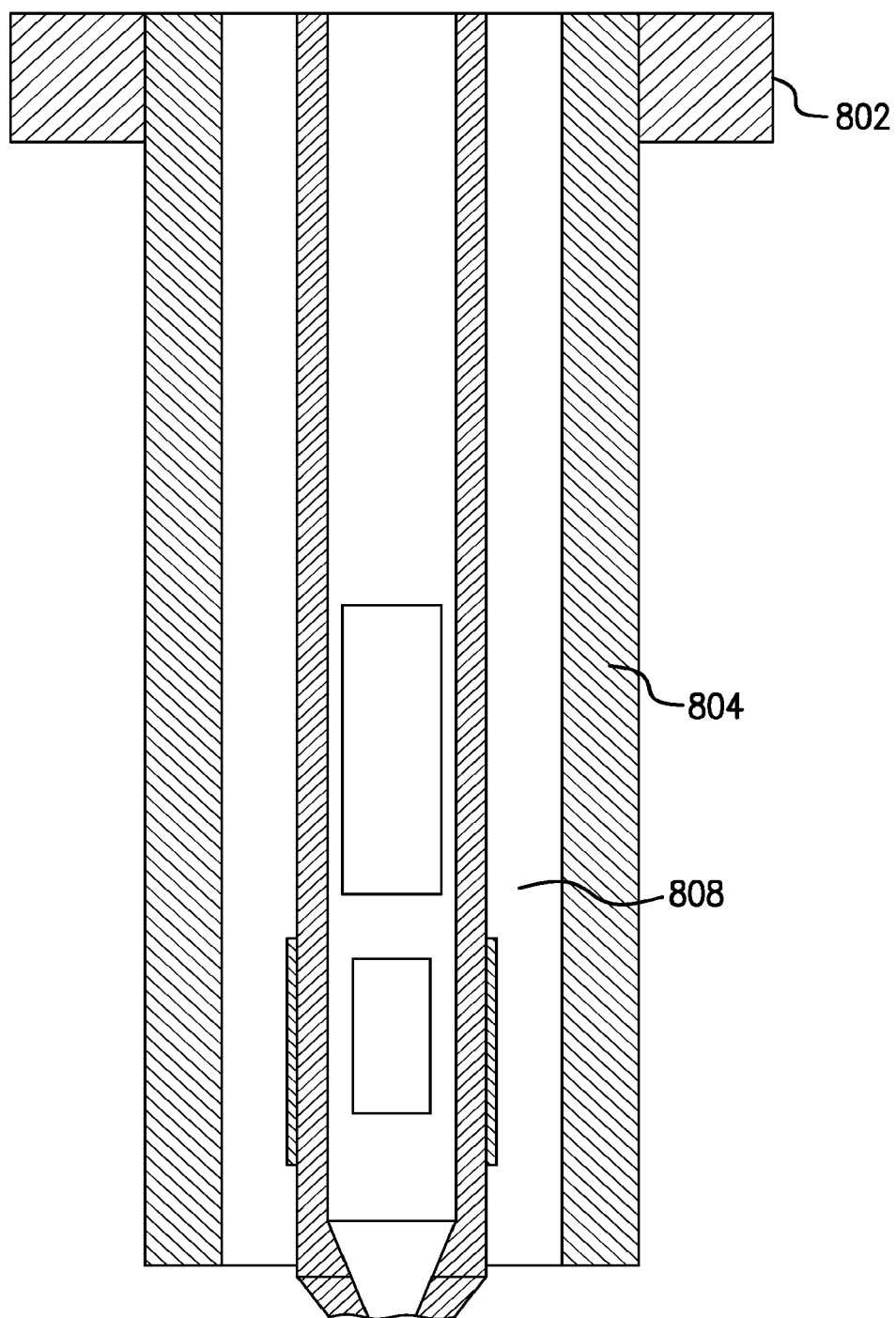
FIG. 8 illustrates exemplary print nozzle.

FIG. 8 illustrates another embodiment of the nozzle 100 with several alternative and additional aspects. In the illustration, a collet 802, such as that discussed herein above, is provided as a send/receive interface unit for the nozzle at the distal end of the nozzle 100 from the nozzle orifice 130. Further, an insulated jacket 804 is provided about the nozzle 100 in order to insulate the nozzle 100 from external heat or radiation sources. Moreover, within the insulated jacket 804 may be provided a cavity 808 about the nozzle 100 that allows for the flow of hot air, cold air, reducing gases, inert gases, plasma, or the like in the cavity 808.

FIG. 9 illustrate with particularity an embodiment of a nozzle connection to a printhead using a collet 802. In the illustration, a repeatedably connectable, mechanical interconnect, in the form of collet 802, is provided between the nozzle 812 and the printhead (not shown). The repeated removability of the illustrated collet 802 allows for repeated electrical and mechanical interchangeability of nozzles and the like, thus allowing for the use of disposable nozzles, and for dedicated limited or single shot or use nozzles, or for nozzles particular to a given print material, heat source, product printed, or the like. Of note, the embodiments of FIG. 9 may connect the printhead/printhead frame, or any manner of pushing/moving the print material 124, to the delivery system for the print material 124, such as the nozzle, which delivery system may include the energy system that melts the print material 124.

Figure 9A:
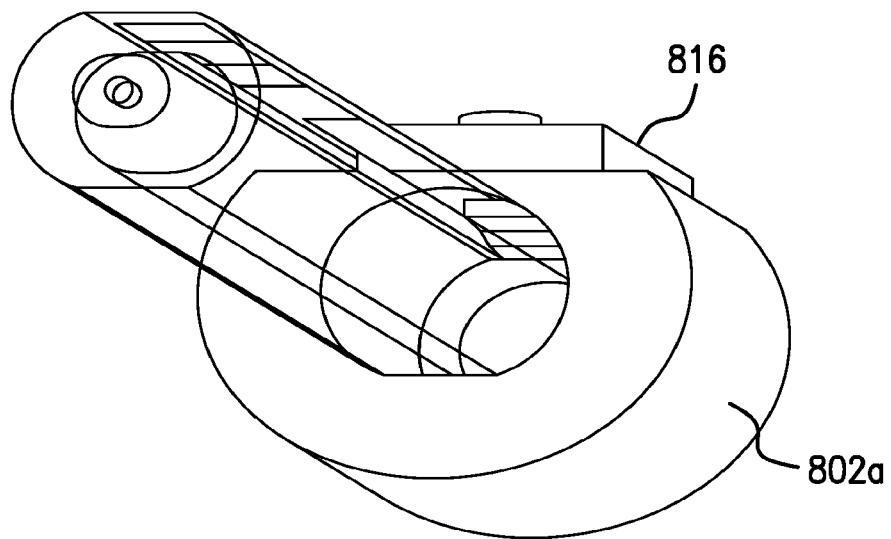
FIG. 9A illustrates exemplary print nozzle connection.
Figure 9B:
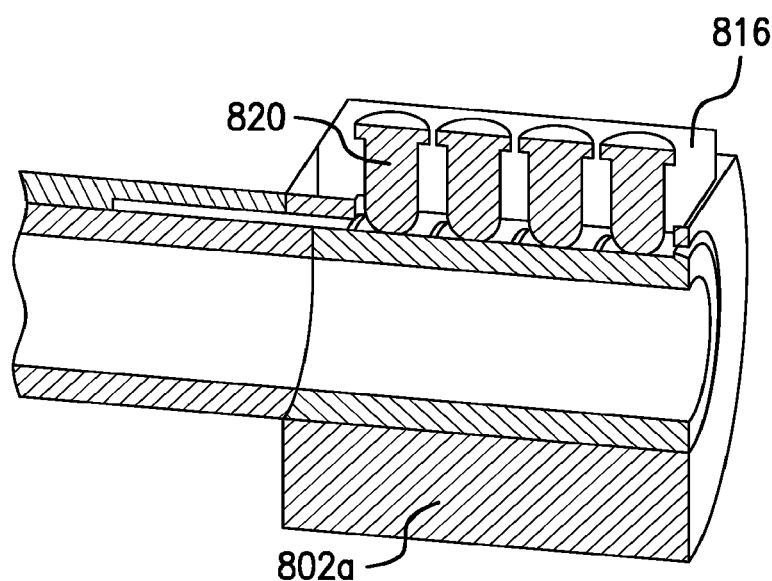
FIG. 9B illustrates exemplary print nozzle connection.

FIGS. 9A and 9B illustrate a cylindrical collet 802a with an associated board 816. The board may be equipped with pins, springs, or the like 820 in order to pick up trace-pads on the distal end of the nozzle. The traces and/or pin interconnects may be proprietary or non-proprietary, and/or may or may not be purpose specific.

Figure 9C:
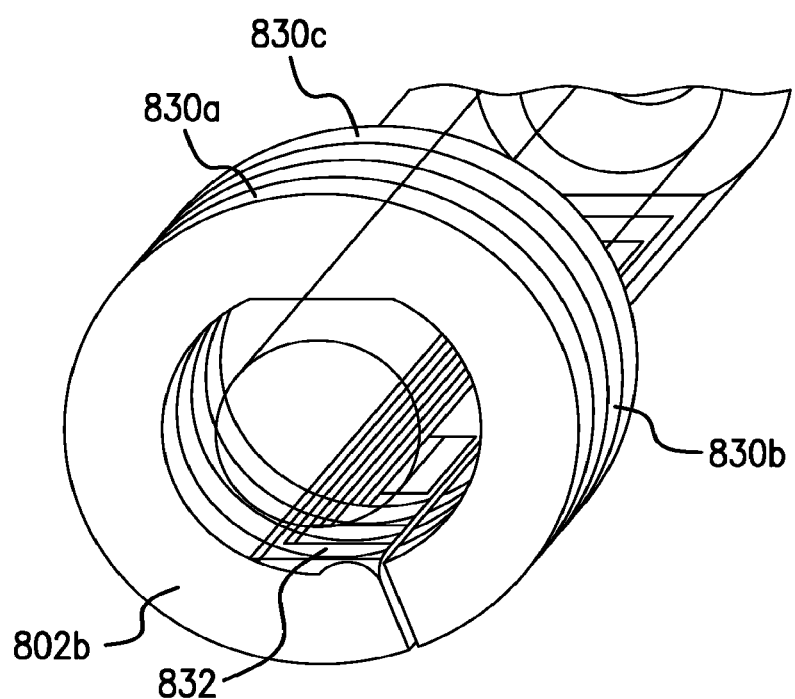
FIG. 9C illustrates exemplary print nozzle connection.
Figure 10:
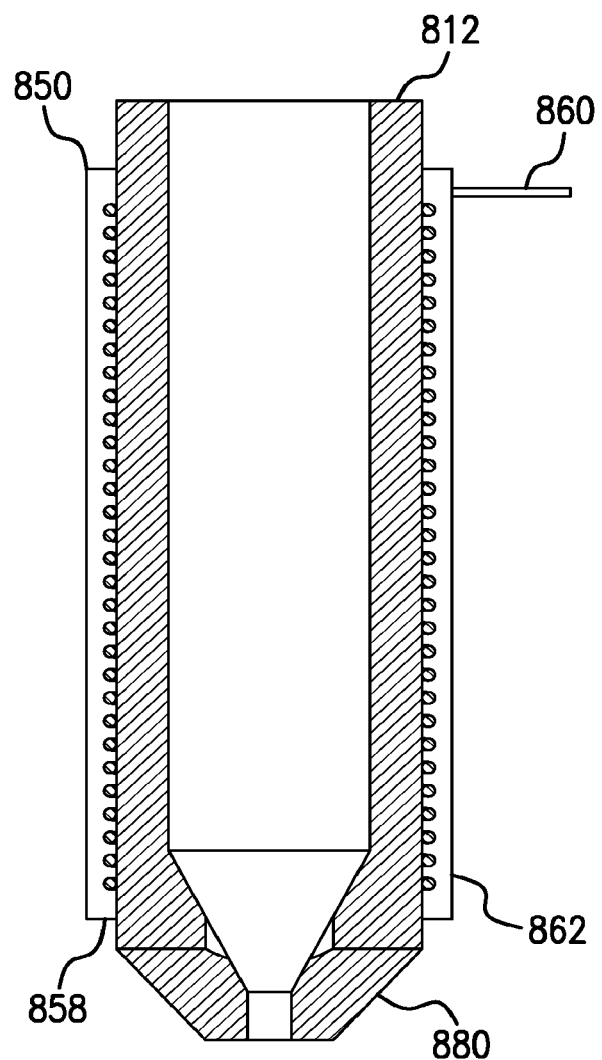
FIG. 10 illustrates exemplary print nozzle.

FIG. 9C illustrates a multi-purpose collect 802b having similar connectivity to the collet of FIG. 9B. In the illustration of FIG. 9C, the collet 802b may be provided with multiple rings 830a, b, c, wherein each ring include pins, springs, or the like 832 that avoid all traces on the nozzle except the traces designated for connectivity to that collet ring. FIG. 10 illustrates an additional and alternative embodiment of a non-conductive sheath 850 formed on or about a nozzle. In the illustration, the sheath 850 may include a resistive wire 860 to provide a heating source for the nozzle tip. Additionally, n sheath 850 may include a high-emissivity surrounding material 858 between the heat source 860 and the nozzle 812, to thereby provide for maximum delivery of heating energy to the nozzle as desired.

Additionally in this embodiment, a low-emissivity, i.e., "space blanket", material 862 may be provided partially, substantially, or completely about the outside of sheath 850, such as to reflect IR energy back inward toward the nozzle 812. Yet further, and in order to optimize heat transfer from the nozzle to the print material 124 at the delivery point, the embodiment of FIG. 10 may include nozzle material and/or a nozzle tip material 880 having good IR transmittance, such as in the 3-5 um) range.

Thereby, the disclosed embodiments allow for the matching of the print material 124 and heat source to the desired or necessary heat, force, material flow rate, and printing rate. Moreover, adjustments in the foregoing factors may be made automatically in accordance with the disclosed embodiments, at least in that one or more processors associated with the printing tool may receive sensor data from the one or more disclosed sensors discussed throughout, and may be associated with computing memory, comprising coded algorithms that executes decisions, via the processor, to modify the tools employed heat source, servo, force on print material 124, consequent flow rate, or the like.

Figure 11:
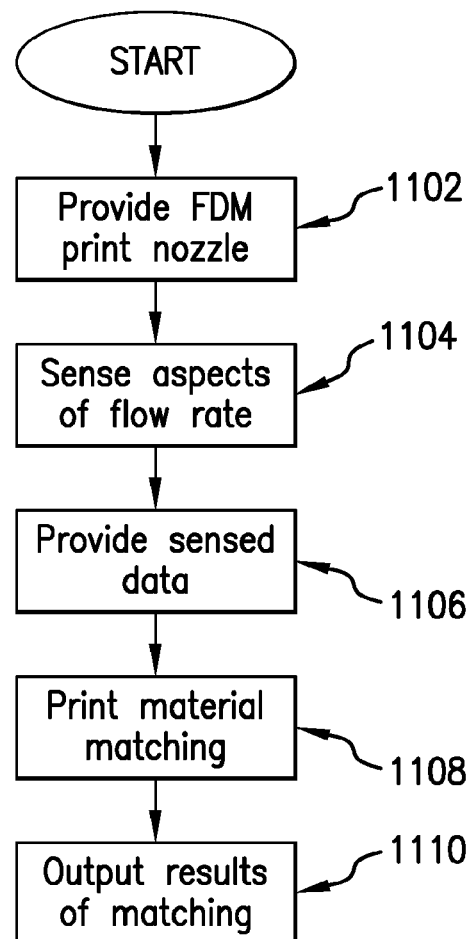
FIG. 11 illustrates a flow diagram.

This is illustrated with particularity in the flow diagram of method 1100 in FIG. 11. At step 1102, a FFF print nozzle having a plurality of sensors integrated on one or more nonconductive substrates is provided. These sensors sense at least two aspects of flow rate at step 1104. Aspects of flow may include, for example, temperature, material pressure, strain, stress, and so on.

The sensed data is provided to one or more computing processors associated with one or more computing memories having resident thereon plurality of process parameter optimization algorithms at step 1106. At step 1108, the algorithms may perform one or more of a matching of the print material 124 to one or more heat sources, heat levels, material forces, nozzle forces, nozzle strains or stresses, and flow rates in order to optimize processes for a desired flow rate and/or printing rate.

At step 1110, the output of step 1108 is provided to one or more robotic or other mechanical or electromechanical aspects of the system subjected to method 1100 in order to execute the output of step 1108 to optimize the FFF printing process. Step 1110 may be performed automatically, and the receipt of instructions or process modifications at step 1110 may occur from a local or remote computing source, and may occur in real time or may occur as a learning from an earlier process run for application to subsequent process runs.

That is, the coded algorithms that execute the decisions discussed above, via the at least one processor, may cause modification of the tools employed, the heat source(s), the material feed servo, the force on print material 124, the consequent flow rate, or the like, may cause those modifications in substantially real time and in-process, or may cause those decision results to be stored. Once stored, either single decision-points may contribute as feedback for subsequent process modification, or multiple decision-points may be required in order to have statistical significance as acceptable feedback to indicate process modification.

In short, the disclosed embodiments allow for the deposition, on the inside or outside or on an interstitial substrate layer, of any metallic or non-metallic nozzle of any sensor relevant to the FFF process. For example, heat, force, flow, strain, stress, extrusion force, and any other aspect that may be sensed may accordingly have a sensor provided to sense that information along the inside or the outside of any nozzle, or on an interstitial substrate layer thereupon. Such sensors may be provided about the center access through the nozzle, longitudinally along the center access of the nozzle, or at any of various points along the nozzle, wherein the placement or shape of such sensors may vary in accordance with the type of sensing to be performed by the subject sensor.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A nozzle for heating and extruding thermoplastic filament into the successive layers to form a three-dimensional (3D) print, comprising:
   a central metal cylinder that is suitable to receive the thermoplastic filament at a first end thereof, and suitable to pass the thermoplastic filament therethrough until the thermoplastic filament is melted and extruded from a second end thereof, the second end being longitudinally distal from the first end along the central metal chamber;
   a first ceramic coating applied to and around at least a portion of an outer wall of the central metal cylinder;
   a strain gauge that is coupled to a surface of the first ceramic coating in contact with the outer wall of the central metal cylinder, to sense deformation of the outer wall;
   an inductive heating sheath wrapped around and axially along the central metal cylinder and insulated from the central metal cylinder by the first ceramic coating, wherein the inductive heating sheath is suitable to cause the melt of the thermoplastic filament as the thermoplastic filament passes axially through the central metal cylinder; and
   a heat source that is operatively coupled with the inductive heating sheath for the melting of the thermoplastic filament, selected from the group consisting of radio frequencies, microwaves, ultrasound, and infrared.

\* \* \* \* \*